United States Patent Office 2,940,978
Patented June 14, 1960

2,940,978

CERTAIN THIOCARBAMATES OF 2-MERCAPTOPYRIDINE N-OXIDE AND PROCESS

Bernard B. Brown, Hamden, Conn., assignor to Olin Mathieson Chemical Corporation, a corporation of Virginia No Drawing. Filed Aug. 14, 1958, Ser. No. 754,939

15 Claims. (Cl. 260—294.8)

This invention relates to a new group of chemical compounds and to pesticidal compositions containing them. More particularly, this invention relates to novel biologically active derivatives of 2-mercaptopyridine-1-oxide. The compounds of this invention are the bases and hydrohalides of the bases having the formula:

$$[C_5H_4N(\rightarrow O)S.C.(:X)NR']_nR$$

in which X is sulfur or oxygen, R' is hydrogen, alkyl, alkenyl or aryl, R is alkyl, alkenyl, aryl, alkylene or arylene and n is the valence of R. The alkyl, alkenyl and alkylene groups contain from 1 to 18 carbon atoms, inclusive. The aryl and arylene groups contain 6 to 14 carbon atoms in the aromatic nucleus and may contain alkyl or alkenyl substituents in addition.

The 2-pyridyl-1-oxide radical, $C_5H_4N(\rightarrow O)$, in the above formula and the 2-mercaptopyridine-1-oxide have the structural formulas:

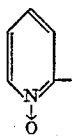 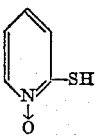

2-pyridyl-1-oxide    2-mercaptopyridine-1-oxide

In the formula given first above, when R is a monovalent alkyl, alkenyl or aryl radical and R' is hydrogen, n is one and the compounds of this more limited group have the formula:

$$C_5H_4N(\rightarrow O)S.C.(:X)NHR$$

Examples of compounds of this formula include:

S-(2-pyridyl-1-oxide) N-methyldithiocarbamate
S-(2-pyridyl-1-oxide) N-ethylmonothiocarbamate
S-(2-pyridyl-1-oxide) N-allylmonothiocarbamate
S-(2-pyridyl-1-oxide) N-i-butylmonothiocarbamate
S-(2-pyridyl-1-oxide) N-cyclohexyldithiocarbamate
S-(2-pyridyl-1-oxide) N-n-octylmonothiocarbamate
S-(2-pyridyl-1-oxide) N-lauryldithiocarbamate
S-(2-pyridyl-1-oxide) N-phenyldithiocarbamate
S-(2-pyridyl-1-oxide) N-naphthyldithiocarbamate
S-(2-pyridyl-1-oxide) N-p-chlorophenyldithiocarbamate In the formula first given above, when R' is an alkyl, alkenyl or aryl group and R has a valence of 1, the subgroup of compounds of this invention has the general formula:

$$C_5H_4N(\rightarrow O)S.C.(:X)NRR'$$

Examples of compounds of this type include:

S-(2-pyridyl-1-oxide) N-dimethylmonothiocarbamate
S-(2-pyridyl-1-oxide) N-diethylmonothiocarbamate
S-(2-pyridyl-1-oxide) N-diethyldithiocarbamate
S-(2-pyridyl-1-oxide) N-methyl-N-phenyldithiocarbamate
S-(2-pyridyl-1-oxide) N-methyl-N-allylmonothiocarbamate
S-(2-pyridyl-1-oxide) N-cyclopentyl-N-methyldithiocarbamate When R in the formula first given above is divalent, the resulting compounds are exemplified by the following:

Di[S-(2-pyridyl-1-oxide)] N-ethylene bis-dithiocarbamate
Di[S-(2-pyridyl-1-oxide)] N-2,4-toluylene bis-monothiocarbamate One method of preparing compounds of the present invention is by the condensation of a salt, for example, a sodium salt of 2-mercaptopyridine-1-oxide with a carbamyl halide according to the following equation:

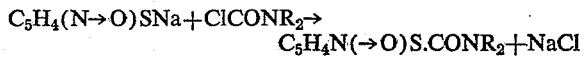

Thiocarbamyl halides may also be used and the R's may be the same or different alkyl, alkenyl or aryl groups. The reaction is effected by heating the reactants in any suitable solvent and separating the product.

When this method of synthesis is used, suitable salts of 2-mercapto-pyridine-1-oxide which may be used include the sodium, potassium, ammonium, calcium and barium salts; amine salts including trimethylammonium and benzyldimethylammonium salts and quaternary ammonium salts including dodecyltrimethylammonium salts, benzylcetyldimethylammonium salts and laurylpyridinium ammonium salts. Suitable carbamyl and thiocarbamyl halides include:

N-dimethylcarbamyl chloride
N-diethylcarbamyl chloride
N-methyl-N-phenylcarbamyl chloride
N-cyclopentyl-N-methyl carbamyl chloride
N-cyclohexyl-N-methylcarbamyl chloride
N-dimethylthiocarbamyl bromide
N-diethylthiocarbamyl bromide
N-methyl-N-phenylthiocarbamyl chloride
N-cyclopentyl-N-methylthiocarbamyl chloride
N-cyclohexyl-N-methylthiocarbamyl chloride The compounds of the present invention may also be prepared by reaction of salts of monothiocarbamic or dithiocarbamic acid with 2-halopyridine-1-oxides according to the following exemplary equation:

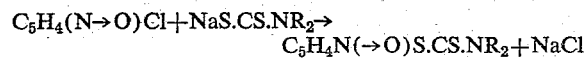

The reaction is effected by heating reactants at a moderate temperature in a suitable solvent, for example, by refluxing a solution in methanol until the reaction is completed, removing by-product sodium chloride and recovering the product.

When this method of synthesis is used, suitable salts of mono- and dithiocarbamic acid which may be used include:

Sodium methyl monothiocarbamate
Sodium dimethyl monothiocarbamate
Potassium ethyl monothiocarbamate
Sodium diethyl monothiocarbamate
Disodium ethylene bis-monothiocarbamate
Sodium methyl dithiocarbamate
Sodium dimethyl dithiocarbamate
Potassium ethyl dithiocarbamate
Barium diethyl dithiocarbamate
Disodium ethylene bis-dithiocarbamate Any 2-halopyridine-1-oxide may be used but 2-chloropyridine-1-oxide or the 2-bromopyridine-1-oxide are more readily accessible and are therefore preferred.

Another method of preparation is the condensation of 2-mercapto-pyridine-1-oxide with suitable isocyanates or isothiocyanates according to the following equation:

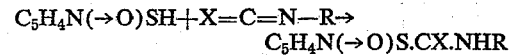

In the above equation X is oxygen or sulfur and R is a monovalent radical as defined above. When an alkylene or arylene diisocyanate is used, the equation becomes:

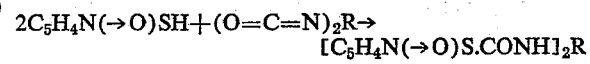

The synthesis is effected by heating the reactants, for example, 2-mercaptopyridine-1-oxide and 2,4-toluylene di-isocyanate, at a moderate temperature, for example 50° to 100° C., preferably in the presence of a basic catalyst, for example, triethylamine, benzyldimethylamine, or other catalysts commonly used for isocyanate reactions. However, the reaction can be carried out without employing a basic catalyst.

Any of the hydrohalide salts of these bases can be prepared by introducing the appropriate hydrogen halide gas into a non-aqueous solution of the base and separating the precipitated salt. The hydrochlorides and hydrobromides are particularly preferred.

The compounds of this invention are useful in diluted compositions as pesticides. They act as soil fungicides, foliage fungicides and in the control of weeds. They are able to penetrate the waxy coating of foliage and fruit and thus serve as longer lasting protective fungicides than, for example, metal salts of organic acids, including the heavy metal salts of 2-mercaptopyridine-1-oxide. The compounds are used advantageously in a proportion of about 15 to 80 percent with any of the diluents usually employed for the application of foliar fungicides or for application to the soil where they control the activity of soil fungi. The compounds of this invention are mostly crystalline solids and are suitably dispersed on an inert finely divided solid and employed as a dust. Suitable solid carriers are clay, talc, bentonite, as well as other carriers known in the art. (See Frear, "Chemistry of Insecticides, Fungicides and Herbicides.") Microcel 805, a synthetic calcium solicate is an example of a suitable solid carrier. The compounds may also be applied as a spray in a liquid carrier either as a solution in a solvent or as a suspension in a non-solvent, for example, water. When applied as a suspension, suitable wetting agents and dispersants are incorporated, Marasperse N is a suitable dispersant of the lignosulfonate type. Igepon AP–78, an ester of sodium isethionate, is a suitable wetting agent. The proportion of dispersant is suitably from about 1 to 3 percent and the wetting agent is suitably from about 2 to 10 percent of the composition. The compounds of this invention may also be admixed with carriers that are themselves active, such as other parasiticides, herbicides and fertilizers.

*Example I*

In a flask was placed 38.4 grams (0.302 mole) of 2-mercaptopyridine-1-oxide and 350 cc. of benzene. Ten drops of triethylamine were added. 36.0 grams (0.302 mole) of phenyl isocyanate was then added, dropwise. The temperature rose from 19° to 33° C. and a precipitate formed during the three-quarter hour of addition. The reaction mixture was now heated. At 50° C. all of the precipitate dissolved. However, at 60–65° C., another precipitate formed. After four hours at 60–65° C., the reaction mixture was cooled and the precipitate was filtered and dried. 34.6 grams of S-(2-pyridyl-1-oxide) N-phenylthiocarbanate was obtained having a melting point of 195–198° C.

*Analysis.*—Calcd. for $C_{12}H_{10}N_2O_2S_2$: S, 13.00%; N, 11.38%. Found: S, 12.38%; N, 11.48%.

Tests as soil fungicides were carried out by placing discs of agar cultures 5 mm. in diameter of the pathogenic fungi listed in the table below on Petri dish plates of potato dextrose agar containing 10, 100 and 1000 parts, respectively, of the S-(2-pyridyl-1-oxide) N-phenylthiocarbamate. The plates were then incubated for 48 hours at 20° C. to give satisfactory growth of the fungi on control plates containing no chemical. The growth of the fungi on the test plates was then observed and described as "0" for no growth, indicating a kill of the fungi, or "+" indicating no inhibition of fungal growth and, therefore, no pronounced depressing effect of the chemical being tested. The following results were obtained:

| Test Organism | Compound of Example I, p.p.m. | | |
|---|---|---|---|
| | 10 | 10² | 10³ |
| Fusarium solani | − | 0 | 0 |
| F. oxysporum f. lycopersici | − | 0 | 0 |
| Phytophthora cactorum | 0 | 0 | 0 |
| Phytophthora cinnamomi | 0 | 0 | 0 |
| Phytophthora citrophthora | 0 | 0 | 0 |
| Pythium aphanidermatum | 0 | 0 | 0 |
| Pythium ultimum | 0 | 0 | 0 |
| Rhizoctonia solani | + | + | 0 |
| Sclerotinia sclerotiorum | 0 | 0 | 0 |
| Sclerotium rolfsii | − | 0 | 0 |
| Verticillium albo-atrum | − | 0 | 0 |

The above results indicate that this compound in suitable concentration controls the growth of each of the above organisms.

*Example II*

2-chloropyridine-1-oxide (0.40 mole) dissolved in 150 ml. of methanol was heated to refluxing. A solution of 0.20 mole of disodium ethylene bis-dithiocarbamate in 250 ml. of methanol was added over a period of 1.5 hours. At the end of the reaction period, the sodium chloride formed was removed by filtration and the filtrate was concentrated to yield crude di[S-(2-pyridyl-1-oxide)] N-ethylene bis-dithiocarbamate. After crystallizing from methanol, the pure material melted at 143.5–144.5° C. and analyzed 13.25 percent nitrogen compared with a theoretical value of 14.1 percent.

*Example III*

2-chloropyridine-1-oxide (0.40 mole) was dissolved in 150 ml. of methanol and heated to refluxing. A solution of 0.20 mole of disodium ethylene bis-dithiocarbamate in 250 ml. of methanol was added over a period of 1.5 hours. At the end of the reaction period, the sodium chloride formed was removed by filtration and the filtrate was concentrated to yield 35 grams (44 percent) of di[S-(2 - pyridyl - 1 - oxide)] N-ethylene-bis - dithiocarbamate melting at 126–130° C. Two recrystallizations from methanol gave 22.0 grams of pure material having a melting point of 142–142.5° C. This was identical with the product of Example II.

Foliage fungicide tests, performed as described in "Phytopathology," 33, 627–632 (1943); 37, 354–356 (1947), showed that a concentration of 25 p.p.m. of the toxicant of this example was sufficient to inhibit the germination and growth of 89 percent of the spores of *Monolinia fructicola*.

A wettable powder formation of the toxicant of this example was prepared by intimately grinding together in a ball mill the following components:

|  | Percent by weight |
|---|---|
| Di[S - (2 - pyridyl - 1 - oxide)] N - ethylene bis - dithiocarbamate | 33 |
| Marasperse N | 2 |
| Igepon AP–78 | 3 |
| Microcel 805 | 62 |
|  | 100 |

When stirred in water, this composition formed a stable suspension which was suitable for application by spraying to growing plants.

*Example IV*

In a flask was placed 38.5 grams (0.302 mole) of 2-mercaptopyridine-1-oxide in 350 ml. of benzene. Five drops of triethylamine were added. 46.4 grams (0.302 mole) of p-chlorophenyl isocyanate was then added dropwise. The temperature rose from 25° to 38° C. and a precipitate formed during the 45 minute addition. The reaction was heated 4 hours at 60° C., cooled, and the precipitate was removed by filtration and dried. The 42.5 grams of precipitate were purified by slurrying with acetone, filtering and drying to give 32.2 grams of product identified as S-(2-pyridyl-1-oxide) N-p-chlorophneylthiocarbamate having a melting point of 198-199.5° C.

*Analysis.*—Calc. for $C_{12}H_9N_2O_2SCl$: S, 11.42%. Found: S, 10.88%.

Example V

In a flask was placed 10.1 grams (0.078 mole) of 2-chloropyridine-1-oxide in 50 ml. of ethanol. 13.4 grams of sodium diethyldithiocarbamate (0.078 mole) was dissolved in 200 ml. of ethanol and added to the refluxing 2-chloropyridine-1-oxide solution over a period of 1.5 hours. The mixture was refluxed 33 hours by which time 58 percent of the theoretical by-product sodium chloride was recovered on filtration. The filtrate was concentrated to an oil which would not crystallize on chilling or scratching. This oil was dissolved in benzene and hydrogen chloride was passed into the solution until precipitation no longer occurred. The precipitated hydrochloride liquefied on standing but crystallized on chilling to a product melting at 135-150° C. The product was purified by dissolving in ethanol and precipitating by addition of n-hexane to give 5.1 grams of material melting at 142-145° C. identified as S-(2-pyridyl-1-oxide) N-diethyldithiocarbamate dihydrochloride.

*Analysis.*—Calc. for $C_{10}H_{16}N_2OS_2Cl_2$: N, 8.88%; Cl, 28.27%. Found: N, 8.76%; Cl, 26.34%.

Example VI

In a flask was placed 19.2 grams (0.15 mole) of 2-mercaptopyridine-1-oxide in 250 ml. of benzene. 15.2 grams (0.15 mole) of triethylamine was added. 20.3 grams (0.15 mole) of N-diethyl carbamyl chloride was added dropwise to the refluxing solution over a period of 0.25 hour. The mixture was refluxed 0.75 hour longer, cooled and the precipitate of by-product triethylamine hydrochloride was removed by filtration. Hydrogen chloride gas was passed into the filtrate to yield 13.0 grams of product having a melting point of 104-15° C. Recrystallization from ethanol yielded 3.5 grams of product melting at 122-40° C. which was identified by infrared spectra and analysed as S-(2-pyridyl-1-oxide) N-diethylmonothiocarbamate dihydrochloride.

*Analysis.*—Calc. for $C_{10}H_{16}N_2O_2SCl_2$: N, 9.42%; Cl, 23.69%. Found: N, 8.17%; Cl, 23.02%.

Example VII

To a solution of 19.7 grams (0.155 mole) of 2-mercaptopyridine-1-oxide in 130 cc. of benzene there was added dropwise, 14.2 grams (0.0817 mole) of toluylene diisocyanate, a commercial mixture of about 80 percent of 2,4-toluylene diisocyanate and 20 percent of 2,6-toluylene diisocyanate. The temperature rose from 24° to 30° C. during the addition. Thereafter, the mixture was heated to 55° C. for two hours and cooled. The precipitate which formed was filtered and dried. The yield was 12.3 grams of product melting above 300° C.

Foliage tests performed as described in "Phytopathology" 33, 627-632 (1943); 37, 354-356 (1947), showed that a concentration of 25 parts per million of the product of this example completely inhibited the germination of the spores of *Monolinia fructicola*, an organism which causes brown rot of stone fruit.

Example VIII

In a flask was placed a solution of 38.1 grams (0.3 mole) of 2-mercaptopyridine-1-oxide in 220 cc. of benzene. To it was added a solution of 29.7 grams (0.3 mole) of allyl isothiocyanate in 50 cc. of benzene. The mixture was heated to 50-60° C. for four hours. It remained a clear solution. The benzene was distilled at 40° C./170 mm. and the unreacted allyl isothiocyanate was distilled at 34° C./15 mm. The residual product distilled at 81-91° C./0.4 mm. and solidified upon cooling, M.P. 60-78° C.

Foliage fungicide tests performed as described in "Phytopathology" 33, 627-632 (1943); 37, 354-356 (1947), showed that a concentration of 25 parts per million of the product of this example completely inhibited the germination of the spores of *Monolinia fructicola*, an organism which causes brown rot of stone fruit.

I claim:

1. A compound selected from the group consisting of free bases and hydrochlorides of free bases having the formula:

$$[C_5H_4N(\rightarrow O)S.C.(:X)NR']_nR$$

in which X is selected from the group consisting of sulfur and oxygen, R is selected from the group consisting of alkyl, alkenyl, alkylene, monocyclic aryl hydrocarbon, arylene hydrocarbon and cycloalkyl containing 1 to 18 carbon atoms, R' is selected from the group consisting of hydrogen and alkyl, alkenyl, monocyclic aryl hydrocarbon and cycloalkyl containing 1 to 18 carbon atoms and n is the valence of R.

2. S-(2-pyridyl-1-oxide) N-phenylmonothiocarbamate.
3. S-(2-pyridyl-1-oxide) N-diethyldithiocarbamate.
4. Di-/S-(2-pyridyl-1-oxide)/N-ethylene bis-dithiocarbamate.
5. Di-/S-(2-pyridyl-1-oxide)/N-p-chlorophenyl monothiocarbamate.
6. A process for the preparation of a compound according to claim 1 which comprises reacting 2-mercaptopyridine-1-oxide with a compound of the formula X=C=N—R in which R and X are defined as in claim 1.
7. A process according to claim 6 in which the reaction is carried out in the presence of a basic catalyst.
8. A process for the preparation of S-(2-pyridyl-1-oxide) N-phenylthiocarbamate which comprises reacting 2-mercaptopyridine-1-oxide with phenylisocyanate and recovering the reaction product.
9. A process according to claim 8 in which the reaction is carried out in the presence of triethylamine.
10. A process for the preparation of a compound according to claim 1 which comprises reacting a salt of 2-mercaptopyridine-1-oxide with a carbamyl halide.
11. A process according to claim 10 in which the reaction is carried out in the presence of a basic catalyst.
12. A process for the preparation of S-(2-pyridyl-1-oxide) N - diethylmonothiocarbamatedihydrochloride which comprises reacting 2-mercaptopyridine-1-oxide with N-diethylcarbamyl chloride, introducing hydrogen chloride and recovering the reaction product.
13. A process according to claim 12 in which the reaction is carried out in the presence of triethylamine.
14. A process for the preparation of a compound according to claim 1 which comprises reacting a 2-halopyridine-1-oxide with a salt of an acid selected from the group consisting of thiocarbamic acid and dithiocarbamic acid.
15. A process for the preparation of di[S-(2-pyridyl-1-oxide)] N-ethylene bis-dithiocarbamate which comprises reacting 2-chloropyridine-1-oxide with disodium ethylene bis-dithiocarbamate and recovering the reaction product.

References Cited in the file of this patent

UNITED STATES PATENTS

| | | |
|---|---|---|
| 2,621,143 | Goodhue et al. | Dec. 9, 1952 |
| 2,681,879 | Gysin et al. | June 22, 1952 |
| 2,686,786 | Shaw et al. | Aug. 17, 1954 |